United States Patent Office 3,082,412
Patented Mar. 19, 1963

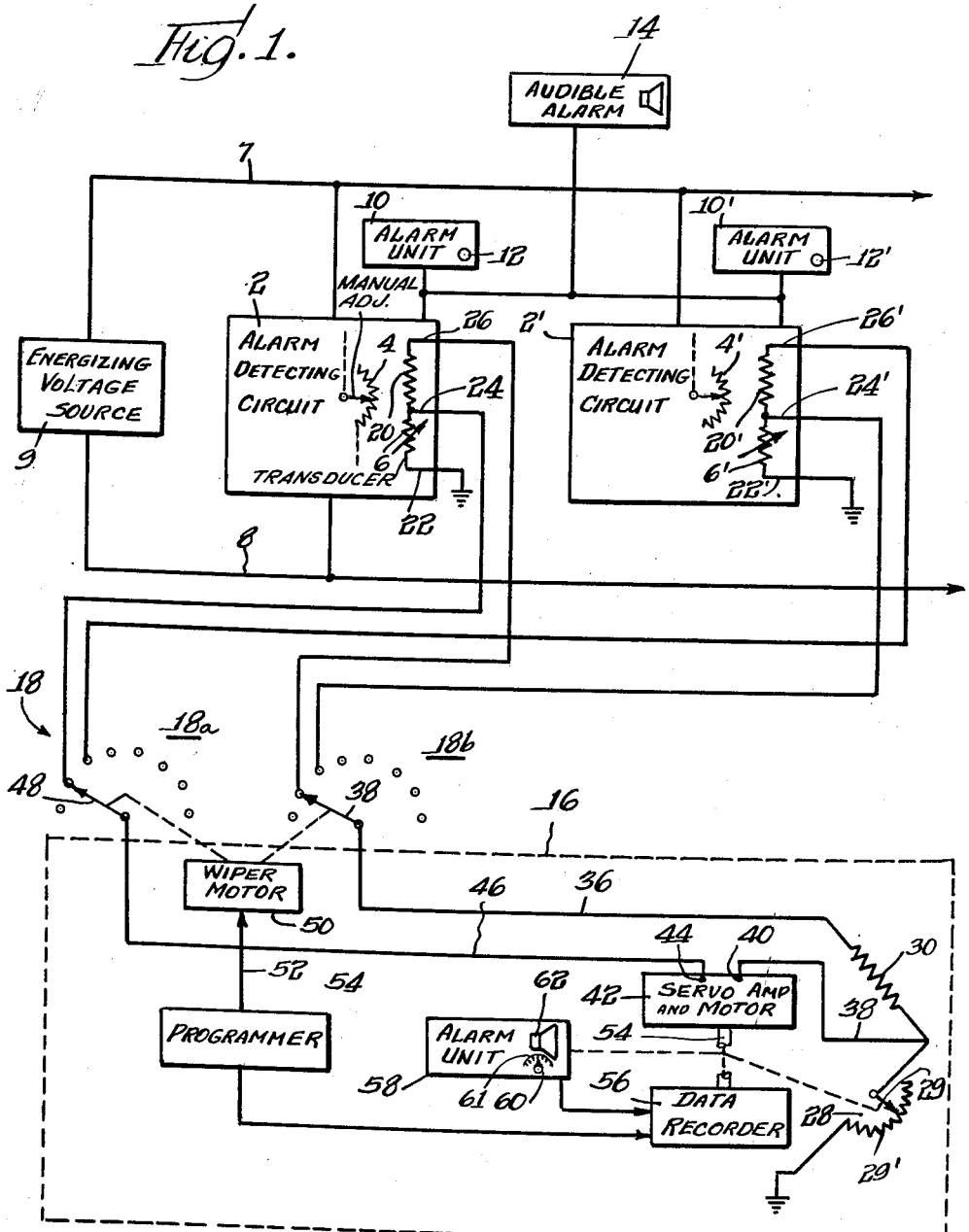

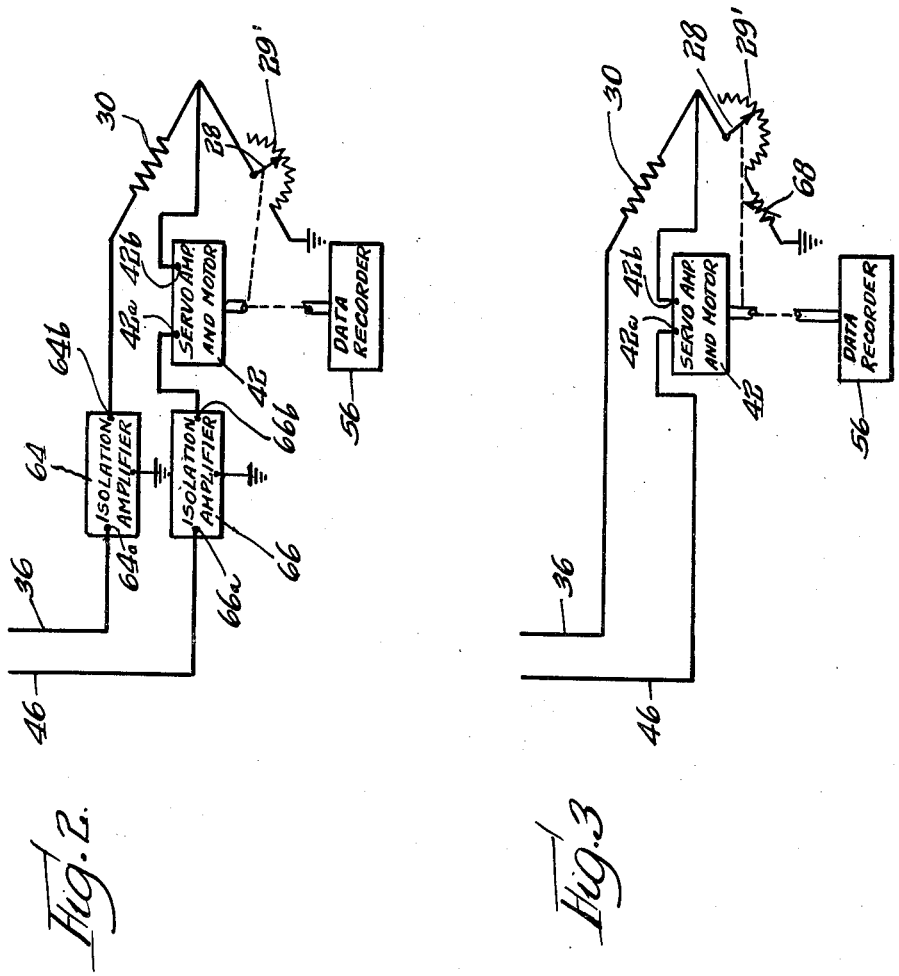

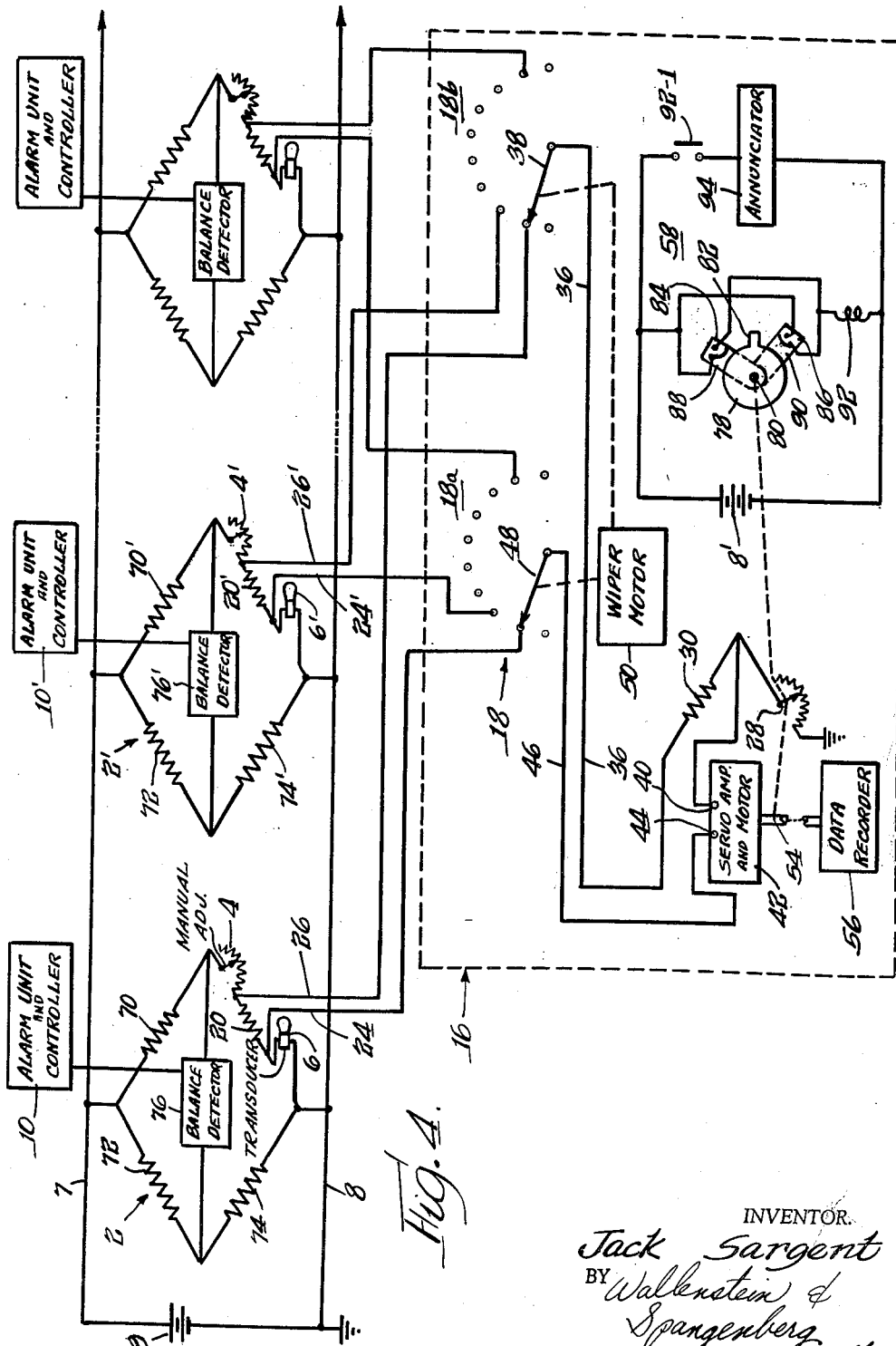

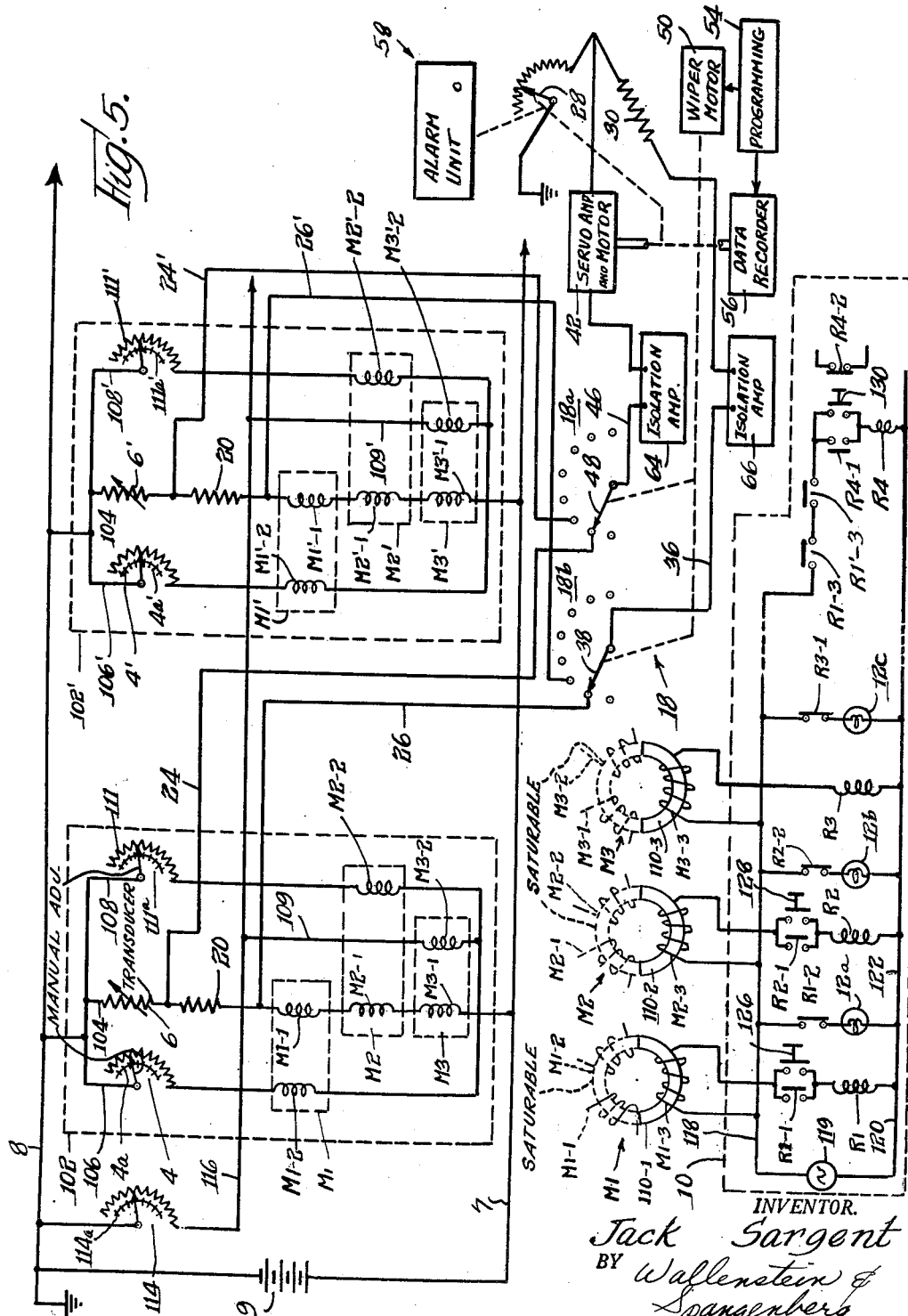

3,082,412
VARIABLE MONITORING SYSTEM
Jack Sargent, Chicago, Ill., assignor, by mesne assignments, to ISI, Incorporated, Los Angeles, Calif., a corporation of Delaware
Filed Apr. 7, 1959, Ser. No. 804,816
14 Claims. (Cl. 340—181)

This invention relates to apparatus for monitoring process and other variables, and has its most important application where a large number of variables are to be monitored through use of bridge-type detecting circuits or the like.

It can be appreciated that systems for monitoring large numbers of variables can be complex and expensive installations. The diminution of the cost of a basic component or circuit which is multiplied hundreds or even a thousand times in such a system can amount to a considerable saving of money which can well mean the difference between a gain or loss of a sale involving hundreds of thousands of dollars and this is particularly so in the highly competitive market of the present day.

In certain applications, it is desirable to monitor the variables for a number of conditions, for example, high and low alarm limits, where the process or machine involved should be shut down and/or a warning given to an operator, and also, perhaps, values between these alarm limits where warning of an impending dangerous or otherwise significant condition is given. It may also be desirable periodically to automatically measure and record the values of the variables. Where continuous monitoring of the variable for alarm limits is necessary, a separate condition detecting circuit is provided for each variable including, for example, a variable responsive impedance element, such as a temperature resistance bulb in the case of a temperature variable or a bellows-operated variable resistor for a pressure variable, and a manually adjustable alarm limit setting impedance. It is apparent that the provision of completely separate detecting circuits for monitoring each of the various conditions and measuring the value of each variable would skyrocket the cost of the monitoring system.

The most common type of bridge detecting circuit in use is the Wheatstone bridge circuit which includes two pairs of serially connected resistance arms connected in parallel across a source of energizing potential, and bridge balance responsive means connected between the junctions of the two pairs of serially connected resistance arms. One of the resistance arms includes the variable responsive resistance element, and the same arm or another arm includes a manually adjustable calibrated resistance for adjusting the value of the variable which will effect belance of the bridge to be detected by said bridge balance responsive means.

Where it is desirable to additionally measure the actual value of the variables from the impedance values of the condition-responsive resistance elements of the bridge circuits, several avenues of approach heretofore proposed may be taken. One approach is to determine the value of the variable from the degree of unbalance from the bridge. This requires, however, the shorting out or the disconnection from the bridge of any manually adjustable resistance elements since they will obviously affect the output of the bridge. This method has numerous serious disadvantages, among them being the added complexity caused by the switching circuits required to disconnect or short out the manually adjustable resistance elements, the dependence of the accuracy of the measurements upon the maintenance of a perfectly fixed and pre-determined input voltage amplitude, and the non-linearity of the impedance value versus bridge output voltage characteristic, necessitating similar non-linear characteristic elements in the impedance measuring apparatus involved.

Another approach heretofore proposed is to remove the variable responsive resistance elements from the detecting circuits during the measuring operation. This is disadvantageous because it requires a cumbersome switching system and, additionally, completely disrupts the operation of the detecting circuits.

One of the objects of the present invention is to provide a monitoring system wherein each variable is continuously monitored by a detecting circuit which monitors, for example, a high alarm limit, and, which further, is provided with additional means for performing some additional function such as measuring and recording the values of all the variables, wherein the additional means uses elements in common with the detecting circuits. A related object of the invention is to provide a monitoring system as just described using bridge-type detecting circuits where said additional means responds to the impedance values of variable responsive impedance elements in the detecting circuits independently of the impedance values of the manually adjustable alarm limit setting impedances therein and without requiring the disconnection of the variable responsive impedance elements from the detecting circuits. A still further related object of the invention is to provide a monitoring system using bridge type detecting circuits wherein the variable responsive impedance elements therein are simultaneously used as a common element in one or more detecting circuits without any of the detecting circuits affecting the other.

A more specific object of the present invention is to provide a monitoring system using bridge type detecting circuits for monitoring conditions of the variables, and, further, wherein means are provided for precisely measuring the values of the variables using the variable responsive impedance elements of the detecting circuits in a way which overcomes the aforesaid disadvantages where Wheatstone bridge or similar detecting circuits are used, for example, so that the measuring apparatus need not require a regulated voltage source and can use linear impedance elements.

In accordance with one aspect of the present invention, each of the aforesaid detecting circuits, which may be a Wheatstone or other type of bridge circuit, is provided with a fixed impedance element preferably connected in series with the variable responsive impedance element. Connections are brought out from the detecting circuit, if they are not already present, which respectively extend from the outer ends of the fixed impedance element and the variable responsive impedance element and also extending from the juncture between these two impedance elements. A common measuring and recording unit is provided which, in a manner to be described, cooperates with said variable responsive impedance elements and said added fixed impedance elements of all of the detecting circuits to measure and record the values of the variables involved in sequence. The common measuring and recording unit also includes a fixed common impedance element connected in series with a common variable impedance element and connections extending from the outer ends of these impedance elements, and from the juncture therebetween, so that the common impedance elements and the corresponding fixed and variable responsive impedance elements of each detecting circuit can be connected to form a Wheatstone bridge circuit where each impedance element forms all or part of a different arm of the bridge circuit. The common variable impedance element of the common measuring and recording unit may comprise a resistance slide wire whose wiper is driven by a servo amplifier and motor means having a pair of input terminals energized by the voltage difference present between said connections leading to the junctures of the two pairs of series connected impedance elements constituting the latter Wheatstone bridge circuit. One of these input terminals is permanently connected to the connection leading to the juncture of said common fixed and variable impedance elements.

Scanning switches are provided which sequentially connect the other input terminal of said servo amplifier and motor means and the connections leading to the outer ends of said common fixed and variable impedance elements to the connections respectively extending to the juncture and the outer ends of the fixed and variable responsive impedance elements of the detecting circuits. The energizing input voltage for each of the Wheatstone bridge circuits so formed is the voltage developed within the detecting circuit scanned across the fixed and variable responsive impedance elements. The servo amplifier and motor means will automatically adjust said common variable impedance element of the common measuring and recording unit to provide balanced bridge circuit. A recorder can be operated by the servo motor to indicate the value of the variable measured. It is apparent that with the bridge balancing arrangement and the connections made between the measuring and recording unit and each detecting circuit that the accuracy of the measuring operation is for all practical purposes independent of the amplitude of the voltage across the fixed and variable impedance elements of the detecting circuits and the setting of the manually variable alarm limit setting impedance elements therein which are located outside of the Wheatstone bridge circuits formed by the scanning switches. Also, where the detecting circuits, for example, are monitoring high alarm limits and the variable responsive impedance elements therein have impedances which increase with the value of the associated variables, any loading effects on the detecting circuits by the common fixed and variable impedances of the measuring and recording unit will be in a direction which will cause an apparent decrease in value of the condition responsive impedance elements and so will not cause the detecting circuits to give false alarms.

In accordance with a most preferred form of the invention, the common measuring and recording unit is provided with isolation amplifiers in the connections leading to the scanning switches for preventing any loading of the detecting circuits, so that the latter may be continuously operative to monitor the conditions of the variables involved. Even in the absence of such isolation amplifiers, it is apparent that the detecting circuits are only inoperative for the relatively small period of time the common measuring and recording unit is connected thereto by the scanning switches.

In accordance with still another aspect of the present invention, the aforesaid detecting circuits, instead of being Wheatstone bridge circuits, are bridge circuits of a unique type which enable the ready continuous monitoring of a number of different conditions or values of the variable, such as both high and low alarm limits, with a minimum of components. Each detecting circuit includes a number of independent parallel current paths extending between a source of unregulated perferably direct current voltage. In contrast to this, a Wheatstone bridge circuit comprises two main parallel current paths with connections therebetween constituted by the bridge balance responsive means. In the novel detecting circuit of the invention, one of the current paths, which will be sometimes referred to as a common current path, includes the aforesaid condition responsive impedance element and a first control winding of at least two magnetic core units which are most advantageously magnetic amplifiers, but which may be control windings, for example, of differential relays.

A second one of the current paths includes a calibrated manually adjustable impedance for setting a high or low alarm limit to be detected by the detecting circuit and a second control winding of one of said magnetic core units connected in bucking relation to the associated first control winding thereof. A third one of the current paths includes a calibrated manually adjustable impedance for setting a condition to be monitored by the detecting circuit such as a low or high alarm limit or any predetermined value of the variable involved, and a second control winding of another one of said magnetic core units connected in bucking relation to the associated first control winding thereof. The manually adjustable impedance of the third current path could be an impedance common to all of the detecting circuits, where the variable value to be monitored is common to all of the variables.

The magnetic core units are designed to perform a control function when the magnetomotive forces thereof are about equal or differ by a given predetermined amount; said control function being the shutdown of the entire process or machine being monitored, and/or which the energization of a visual and/or audible signalling means. It is apparent that the current flowing through the common current path containing the variable responsive impedance element has its effect on the other two current paths solely through the medium of the flux in the cores involved, and said other current paths, on the other hand, are completely independent (i.e. have no effect) on one another. In this way, a number of conditions of the variable can be monitored simultaneously and continuously using the same variable responsive impedance element as a common control element.

In the most preferred form of the aspect of the invention now being described, the common current path is preferably provided with a fixed impedance connected between the first control windings of said magnetic core units and the variable responsive impedance element, and connections extending from the outer ends and the juncture of the fixed and variable responsive impedance elements leading to, or associated with, said scanning switches of the aforesaid common measuring and recording unit. Thus, with the arrangement just described, the values of the variables can be periodically automatically recorded and various other conditions of the variables simultaneously and continuously monitored. Additionally, the common measuring and recording unit can be provided with its own alarm unit which indicates when any variable being scanned exceeds a given value. Other advantages and features of the invention will become apparent upon making reference to the specification to follow, the claims and drawings wherein:

FIG. 1 is a simplified schematic diagram partly in box form, illustrating one aspect of the present invention;

FIG. 2 is a schematic diagram of an application of the invention of FIG. 1 wherein the primary detecting circuits are Wheatstone bridge circuits;

FIG. 3 illustrates a modified form of the invention of FIG. 1;

FIG. 4 illustrates a further modified form of the invention of FIG. 1; and

FIG. 5 is a schematic diagram illustrating another aspect of the invention wherein the detecting circuits are designed to independently and simultaneously monitor a variety of conditions of the variables using common components.

Referring now to FIG. 1, there is shown in box form a number of alarm detecting circuits 2, 2', etc. for respectively monitoring the conditions of associated variables, which may be temperature, pressure, flow or other variables. Each alarm detecting circuit is provided with a manually adjustable impedance element 4 or 4', etc. calibrated in terms of the units of the associated variable which represent possible alarm limits of the variable. Each detecting circuit further includes a variable responsive impedance element 6 or 6', etc. whose impedance value indicates the value of the associated variable. All of the associated alarm detecting circuits 2 or 2', etc. are connected in parallel across power buses 7—8 connected to the opposite terminals of an energizing voltage source 9. The detecting circuits are such that the current flowing through each of them is a function of both the value of the manually adjustable impedance elements 6 or 6', etc. therein and the condition responsive impedance element 6 or 6', etc.

When the value of a particular variable reaches an alarm limit set by the associated manually adjustable impedance element 6 or 6', etc., the circuit operates to perform a control function, such as the energization of an associated visual alarm unit 10 or 10', etc. including an alarm light 12, 12', etc. and a common audible alarm unit 14, or other control apparatus, not shown, which may shut down the entire system whose variables are being monitored.

In accordance with one aspect of the invention, measuring and recording apparatus generally indicated by reference numeral 16 is provided for automatically measuring and recording the values of the variables as determined by the impedance value of the condition responsive impedance elements 6, 6', etc. Scanning switch means 18 is provided for sequentially connecting the measuring and recording apparatus 16 to the alarm detecting circuits 2, 2', etc. The alarm detecting circuits 2, 2', etc. are each modified to the extent of adding a fixed impedance element 20 or 20', etc. directly in series with the associated condition responsive impedance element 6 or 6', etc. Of course, the addition of such an impedance element requires a change in the calibration of the associated manually adjustable impedance 4 or 4', etc. or in the values of associated impedance (not shown). Conductors 22—24—26 (or 22'—24'—26', etc.) extend respectively from the outer end of the associated condition responsive impedance element 6 (or 6', etc.) the juncture between the impedance elements 6 and 20 (or 6' and 20', etc.) and the outer end of the fixed impedance element 20 (or 20', etc.).

Where it is convenient to make one of the conductors a common or ground conductor, conductor 26 (or 26', etc.) being shown as the grounded conductor, conductors 22 and 24 of alarm detecting circuit 2 extend to corresponding stationary terminals of different levels 18a and 18b of scanning switch means 18, and the other corresponding conductors (such as 22' and 24') of the other alarm detecting circuits extend to other respective corresponding stationary terminals of the levels 18a and 18b of scanning switch means.

As will appear, the aforesaid condition responsive and fixed impedance elements 6 and 20 (6' and 20', etc.) of the various alarm detecting circuits each form two arms of a Wheatstone bridge circuit completed by common impedance elements forming part of the measuring and recording apparatus 16 and connected in sequence by the scanning switch 18 to the various alarm detecting circuits 2, 2', etc. These common impedance elements in the measuring and recording apparatus 16 comprise a variable impedance element 28 which may be a slide wire unit having a wiper 29 slidable along a slide wire 29', and a fixed impedance element 30. The outer end of the fixed impedance element 30 is connected by a conductor 36 to the wiper 38 of the level 18b of scanning switch means 18 and the outer end of the slide wire resistance element 29' is connected to ground.

The juncture between the common impedance elements 28 and 30 is connected by a conductor 38 to an input terminal 40 of servo amplifier and motor means 42 which may be a conventional servo amplifier and motor unit used to balance automatically the bridge circuits of the type now being described. The servo amplifier and motor means 42 has a second input terminal 44 which is connected by a conductor 46 to the wiper 48 of the other level 18a of scanning switch means 18. The wipers of the levels 18a and 18b of the scanning switch may be driven by a suitable wiper motor 50 in a manner well-known in the art, the wiper motor being advanced by means of suitable pulses fed thereto through a conductor 52 extending from any suitable programmer 54 which determines the particular periods when the values of the variables are to be recorded, which may be hourly or some other basic time period.

The servo amplifier and motor means 42 has a shaft 54 which controls the movement of the wiper 29 of the variable impedance element 28 and also the operation of a suitable data recorder 56 which types or otherwise provides a record of a numerical value with the information involved. Such a recorder is disclosed in U.S. Patent No. 2,701,748.

In the most generalized form of the present invention, an alarm unit, generally indicated by reference numeral 58, is provided which is operated by the servo motor shaft 54. The alarm unit 58 includes a calibrated manually adjustable control knob 60 for setting a variable value on a dial 61 which value applies to all scanned variables. When any variable is scanned having this value, the alarm unit may sound an audible alarm 62 and change the color of the information printed by data recorder 56 in the manner disclosed in said U.S. Patent No. 2,701,748. The provision of a single control knob 60 for setting a common alarm value would probably be practical only where all variables have the same alarm limits. Otherwise, separate adjustable control units for each variable should be provided which are operative only when the associated variable is scanned.

It is apparent from the circuit just described that, when the wiper motor 50 is energized, the scanning switch wipers 34 and 48 will advance between their corresponding stationary contact terminals to sequentially connect the common impedance elements 28 and 30 with the impedance elements 6 and 20, 6' and 20', etc. of the alarm detecting circuits 2, 2', etc. Obviously, the scanning switch wipers 38 and 48 must remain on the stationary contact terminals involved for a sufficient time to enable the measuring and recording apparatus 16 to operate to record the value of the variables involved before being moved to the next stationary contact terminals.

In the case where the condition responsive impedance elements 6, 6', etc. are of a type where the impedance thereof increases with the value of the associated variables, any loading effects which arise by virtue of the connection of the external common impedance elements 28 and 30 across the impedance elements 6 and 20 (or 6' and 20', etc.) will be in a direction which will prevent operation of the alarm detecting circuit involved where high alarm limits are being monitored. Since the measuring and recording apparatus 16 is connected to each detecting circuit 2, 2', etc. for only a short period, the overall operation of the detecting circuits are not materially affected for most applications. However, in accordance with another aspect of the present invention, means are provided for preventing loading of the detecting circuits during the connection of the common impedance elements 28 and 30 thereto, so that they are continuously operative even during the measuring and recording operation. This form of the invention is illustrated in FIG. 2 wherein a pair of high impedance input isolation amplifiers 64 and 66 are, respectively, inserted in the lines 36 and 46 leading to the wipers 38 and 48 of the scanning switch 18. The isolation amplifiers have input terminals 64a and 66a and output terminals 64b and 66b, respectively. Input terminal 64a of isolation amplifier 64 is connected to the conductor 36 and input terminal 66a of isolation amplifier 66 is connected to conductor 46. Output terminal 64b of the isolation amplifier is connected to the outer end of the fixed common impedance 30, and output terminal 66b of isolation amplifier 66 is connected to one of the input terminals 42a of the servo amplifier and motor unit 42. The other servo unit input terminal (42b) is connected to the juncture of the common impedance elements 28 and 30. Input terminals 42a and 42b obviously are floating (i.e. ungrounded) terminals.

Isolation amplifiers 64 and 66 have a unity gain and high impedance inputs relative to the impedance values of the impedance elements 4 and 20 (4' and 20', etc.), so that no loading effects are present. Philbrick Research Associates of Boston, Massachusetts currently manufactures an isolation amplifier (Model USA3) useful in the circuit described.

As previously indicated, one advantage of the present invention is that the slide wire resistance 29' can be a linear element where the condition responsive impedance elements 20, 20' etc. are linear elements, which is not the case where the measuring circuit operates on the degree of unbalance of a Wheatstone bridge circuit forming the primary alarm detecting circuit involved. Ancillary to this advantage, is that the present invention makes it convenient to measure the difference between the value of a reference variable and the value of the variable scanned by scanning switch means 18. In the aforesaid situation where the value of the scanned variable is determined by the degree of unbalance of a Wheatstone bridge circuit, the operations required to obtain such a differential variable value involve the introduction of second order correction factors since the impedance-variable value characteristic of the reference condition responsive element may be linear while the output-impedance characteristic of the bridge output is non-linear. With the present invention, differential variable values can be obtained by comparing two linear impedance-variable value characteristics by simply adding a reference variable responsive impedance element in series with the common variable impedance element 28, as illustrated in FIG. 3. As there shown, a condition responsive impedance element 68 is connected in series with the slide wire resistance 29'.

Refer now to FIG. 4 which illustrates the application of the invention shown in FIG. 1 to alarm detecting circuits comprising Wheatstone bridges. One of the arms of each Wheatstone bridge circuit includes the variable responsive impedance element 6 shown as a temperature resistance bulb 6 (or 6', etc.) in series with the fixed impedance element 20 (or 20', etc.) in the form of a fixed resistance and the manually adjustable impedance element 46 or 46', etc. in the form of a variable resistance. The other arms of each of the Wheatstone bridge circuits are shown to include resistors 70, 72 and 74 (or 70', 72' and 74', etc.). The power bus 7 is connected to the juncture of resistors 70 and 72 (or 70' and 72') and power bus 8 is connected between resistor 74 (or 74', etc.) and the resistance bulb 6 (or 6', etc.). The energizing voltage source 9 connected to the power buses 7 and 8 could be a source of direct or alternating current voltage. In the latter case, the various impedance arms could be reactance elements, although resistors are much more practical to use in any case.

A null balance detector 76 of any well known type is connected between the juncture of each of the resistors 72 and 74 (or 72' and 74', etc.) on the one hand, and resistor 70 (or 70', etc.) and the manually adjustable resistor 4 (or 4', etc.) on the other hand. Each null balance detector may include a sensitive relay or the like which controls an associated alarm unit or controller 10 (or 10', etc.).

In the manner previously described, the measuring and recording apparatus 16 is sequentially connected to the conductors 24 and 26 (or 24' and 26', etc.) extending to the variable responsive and fixed impedance elements 6 and 20 (or 6' and 20', etc.) to form individual external Wheatstone bridge circuits energized from the voltage drop across the latter impedance elements forming one of the arms of the Wheatstone bridge circuits forming the alarm detecting circuits 2, 2', etc.

FIG. 4 shows the details of an exemplary alarm unit 58 associated with the measuring and recording apparatus 16. Although this alarm unit may take a variety of forms, it is shown as including a cam 78 mounted on a shaft 80, the cam having a cam projection 82 adapted to close a first micro-switch 84 and/or a second micro-switch 86 respectively carried by adjustable arms 88 and 90 adjustable in position about an axis common with the shaft 80. The cam shaft 80 is driven through suitable gearing (not shown) by the servo motor shaft 54, so that the position of the cam projection 82 is a function of the value of the variable being scanned. It is apparent that the adjustable arms 88 and 90 carrying the micro-switches 84 and 86 may be adjusted so that closure thereof will take place at the selected upper and lower alarm limits. Switches 84 and 86 are connected in series with a control relay 92 which, when energized from a suitable voltage source 8' connected in series with the micro-switches 84—86 and relay 92, closes contacts 92–1 of relay 92 to connect the voltage source 8' to any suitable annunciator unit 94.

The Wheatstone bridge type detecting circuits shown in FIG. 4 are satisfactory for most purposes. However, where a number of conditions of the variables involved are to be continuously and simultaneously monitored, a modified form of detecting circuit constituting another aspect of the invention and illustrated in FIG. 5 offers many advantages. These improved detecting circuits identified in FIG. 5 by reference numerals 102 and 102' each include a number of completely independent current paths 104—106—108—109 (or 104'—106'—108'—109', etc.) connected between power buses 7 and 8. Power buses 7 and 8 extend between the terminals of energizing voltage source 9 which is a direct current voltage source. The current path 104 (or 104', etc.) comprises a series circuit of a condition responsive resistor 6 (or 6', etc.) whose value is a measure of the value of the variable involved, a fixed resistor 20 (or 20', etc.), the first control winding M1–1 (or M1'–1, etc.) of a first magnetic core unit M1 (or M1', etc.), a first control winding M2–1 (or M2'–1, etc.) of a second magnetic core unit M2 and a first control winding M3–1 (or M3'–1, etc.) of a third magnetic core unit M3. Although the magnetic core control units may take other forms, in its most preferred form as illustrated, each comprises a magnetic amplifier having a saturable core, such as 110–1, 110–2 or 110–3 etc., a first control winding such as M1–1, M2–1 or M3–1, etc., a second control winding, such as M1–2, M2–2 or M3–2, etc., and an output winding, such as M1–3, M2–3 or M3–3, etc., all of which windings are wound around the associated magnetic core. The control windings of each magnetic core unit are wound about the associated core or are connected in bucking relation, so that the magnetomotive forces developed therein oppose one another.

The second current path 106 (or 106', etc.) extends between power buses 7 and 8 and includes a series circuit of a manually adjustable, high alarm limit seting resistor 4 (or 4', etc.) having a scale 4a (or 4a', etc.) calibrated in units of the associated variable representing the selectable high alarm limits thereof, and the second control winding M1–2 (or M1'–2, etc.) of the magnetic core unit M1 (or M1', etc.).

The third current path 108 (or 108', etc.) extends between power buses 7 and 8 and includes a series circuit of a manually adjustable, low alarm limit setting resistor 111 (or 111', etc.) having a scale 111a (or 111a', etc.), and the second control winding M2–2 (or M2'–2, etc.) of magnetic core unit M2 (or M2', etc.).

The fourth current paths 109, 109', etc. of the various detecting circuits are each connected in series with a manually adjustable resistor 114 common with all of the detecting circuits and having a scale 114a calibrated in units of the variables involved, assuming that all of the variables are of the same type. The common manually adjustable resistor 114 is connected between the power bus 8 and a common bus 116. Each of the individual current paths 109, 109', etc. of the various detecting circuits is connected to this common bus at its upper end and includes a second control winding M3–2 (or M3'–2, etc.) of the third magnetic core control unit M3 (or M3', etc.) connected to the power bus 7.

The adjustable values of the various manually adjustable resistors 4—4', etc., 111—111', etc. and 114 are such that the magnetomotive forces or ampere turns developed in the control windings of the current paths associated therewith will balance the magnetomotive forces or ampere turns developed in the control windings in the current paths 104—104', etc. when the variable reaches the various limits set thereon. When the magnetomotive forces developed in the control windings are substantially equal, the associated core will be in an unsaturated state and, with respect to alternating current signals, the impedance of the associated output winding (M1–3, M2–3, M3–3, etc.) will be relatively large. When these magnetomotive forces are substantially unequal, the associated core will be saturated where the impedance of the output winding will be relatively small.

The varying impedance conditions of the output windings of the magnetic core units can be used to control the energization or de-energization of an associated relay. One end of the output winding M1–3 of each magnetic core unit M1 (or M1', etc.) is connected to a power bus 118 extending from one terminal of a source 119 of alternating current voltage (e.g. ordinary 60 cycle supply) and the other end thereof is connected to a set of normally-open holding contacts R1–1 of a relay R1. The coil of the relay R1 is connected in series with the contacts R1–1 and extends to a power bus 120 connected to the other terminal of the voltage source 119. A normally-open pushbutton reset switch 126 is connected in parallel with the normally-open holding contacts R1–1. Relay R1 has a set of normally-closed contacts R1–2 connected between the power bus 118 and an alarm lamp 12a connected to the other power bus 120. The relay R1 is designed so that normally-open contacts R1–1 will open and normally-closed contacts R1–2 will close when the current flowing through the coil of R1 drops to a value caused by the high impedance condition of the output winding M1–3 resulting from the substantially complete unsaturation of its associated core, which indicates that the value of the selected high alarm limit for the variable involved has been exceeded. This will result in the energization of the alarm lamp 12a. When normally-open contacts R1–1 open, the relay R1 will remain de-energized until the normally-open pushbutton switch 126 is momentarily closed. If, by that time, the value of the variable involved has gone below the selected high alarm limit thereof, the relay R1 will be re-energized and the alarm lamp 12a will be extinguished when the pushbutton switch 126 is momentarily depressed, since the current passing through the coil of relay R1 will be sufficient to keep the contacts R1–1 closed and contacts R1–2 open.

In a similar way as just described, the magnetic core unit M2 (or M2') controls the energization and de-energization of a relay R2 and a low alarm limit indicating lamp 12b. The output winding M2–3 of the control unit M2 is, accordingly, connected in series with a set of normally-open contacts R2–1 of a relay R2 shunted by a normally-open pushbutton reset switch 128. A set of normally-closed contacts R2–2 of relay R2 are connected between low alarm limit indicating lamp 12b and power bus 118. It is apparent that lamp 12b is lit when relay R2 is de-energized which occurs when the magnetomotive forces in the control windings M2–1 and M2–2 are approximately equal and opposite in direction.

The magnetic core control unit M3 (or M3', etc.) associated with each detecting circuit has an output winding M3–3 connected between the power bus 118 and the coil of a relay R3 without the interposition of holding contacts. The bottom end of the latter relay coil is connected to the other power bus 120. The relay R3 has a set of normally-closed contacts R3–1 connected between power bus 118 and an indicating lamp 12c which is connected to the power bus 120. With this arrangement, whenever the indicating lamp 12c is energized, it indicates that the associated variable has reached a value determined by the adjustment of the common manually adjustable resistor 114. By progressively varying variable resistor 114 and viewing all of the indicating lamps 12c which are energized for a particular adjustment of resistor 114 (or 114', etc.), the distribution of variables having particular values can be instantly determined.

Where it is desired to shut down a process or machine whose variables are being monitored whenever any variable exceeds a high alarm limit, the R1 relays associated with the magnetic core units M1, M1', etc. are provided with sets of normally-open contacts R1–3, R1'–3, etc., connected in series between power bus 118 and a set of normally-open holding contacts R4–1 of a shutdown relay R4. A normally-open pushbutton reset switch 130 is connected across contacts R4–1. The coil of relay R4 is connected between contacts R4–1 and power bus 120. It is apparent that relay R4 will become de-energized when any of the relays R1 are de-energized by the associated variable exceeding its upper alarm limit. Shutdown relay R4 has a set of normally-closed control contacts R4–2 for controlling the operation and shutdown of the machine or process being monitored.

In the circuit just described, it is apparent that any momentary high or low alarm condition of a variable will be continuously indicated on the associated indicating lamp 12a, 12, etc. until the appropriate reset pushbutton 126, 128, etc. is depressed. If a variable has a value somewhat in excess of a given pre-set alarm limit, the resultant unbalance of magnetomotive forces in the associated magnetic amplifier core will result in the loss of the alarm indication when the reset pushbutton is depressed. If this operation of the system is not satisfactory, the magnetic amplifier circuit described may be replaced by a magnetic amplifier circuit of a well-known type which is sensitive to the direction of unbalance of the magnetomotive forces in the core involved. In such case, the relay R1 when initially de-energized will remain in a de-energized condition until the direction of the unbalance of the magnetomotive forces in the core reverses to indicate a normal condition of the variable and the appropriate reset pushbutton switch is depressed. A magnetic amplifier circuit of this type is being currently marketed by Sigma Instrument Company, Boston, Mass. as Model No. 82K 2N–91743.

The various aspects of the present invention have provided an exceedingly flexible monitoring system wherein a number of conditions of one or a large number of variables can be determined in a simple, economical and reliable manner.

It should be understood that numerous modifications may be made of the preferred forms of the various aspects of the invention above described without deviating from the broader aspects of the invention.

What I claim as new and desire to protect by Letters Patent of the United States is:

1. Monitoring apparatus for monitoring the conditions of a number of variables comprising: individual detecting circuits for the variables each comprising: condition-responsive impedance means and other impedance means across which the voltage drop varies with the condition of the associated variable, a source of energizing potential connected to said condition-responsive impedance means and other impedance means, and first control means responsive to a given condition of the associated variable as determined from the impedance of said variable responsive impedance means; and a common circuit for measuring the values of all of said variables, said common circuit including a common variable impedance means forming one arm of a bridge circuit, other common impedance means forming another arm of a bridge circuit and connected in series with said variable impedance means and a pair of bridge energizing input terminals coupled to the unconnected ends of the last two mentioned impedance means, scanning switch means for sequentially connecting said bridge energizing input terminal means to the unconnected outer ends of said impedance means of each of said detecting circuits for forming therewith an operative bridge measuring circuit where the last mentioned impedance means forms two arms thereof and which is energized by the voltage developed across the scanned condition-responsive impedance means and the associated other impedance means of the scanned detecting circuits, bridge balancing means for varying said common variable impedance means until the operative bridge circuit is balanced, and second control means including variable value indicating means responsive to said bridge balancing means for indicating the value of the variable scanned.

2. Monitoring apparatus for monitoring the conditions of a number of variables comprising: individual detecting circuits for the variables each comprising: condition-responsive impedance means and a fixed impedance connected in series with said condition-responsive impedance means across which the voltage drop varies with the condition of the associated variable, manually adjustable impedance means for setting the value of the variable to be monitored, a source of energizing potential connected to said impedance means, control means responsive to current flow in the associated detecting circuit as determined by the impedance of said variable responsive impedance means and said manually adjustable impedance means; and a common circuit for measuring the values of all of said variables, said common circuit including a common variable impedance means, scanning switch means for sequentially connecting said common variable impedance means to said condition-responsive impedance means of each of said detecting circuits for forming therewith an operative bridge measuring circuit which excludes said manually adjustable impedance means and is energized, at least in part, by the voltage developed across the scanned condition-responsive impedance means and fixed impedance, bridge balancing means for varying said common variable impedance means until the operative bridge circuit is balanced, and second control means including variable value indicating means responsive to said bridge balancing means for indicating the value of the variable scanned.

3. Monitoring apparatus for monitoring the conditions of a number of variables comprising: individual detecting circuits for the variables each comprising: manually adjustable impedance means calibrated in units of possible high alarm limits of the associated variable, condition-responsive impedance means and a fixed impedance connected between said condition-responsive impedance means and said manually adjustable impedance means, a source of unregulated energizing potential connected to said impedance means, the voltage drop across said fixed and condition-responsive impedance means varying with the condition of the associated variable, control means responsive to current flow in the associated detecting circuit as determined by the impedance of said variable responsive impedance means and said manually adjustable impedance means; and a common circuit for measuring the values of all of said variables, said common circuit comprising a common variable impedance means and a common fixed impedance means connected in series circuit relation, bridge unbalance sensing means having a pair of signal input terminals, one of which is connected to the juncture of said common variable impedance means and said common fixed impedance means, said bridge unbalance sensing means varying said common variable impedance means until the signal voltage across said signal input terminals is substantially zero, scanning switch means for sequentially connecting said common variable impedance means and said common fixed impedance means to said variable-responsive impedance means and said fixed impedance means of each of said detecting circuits for forming therewith operative Wheatstone bridge circuit which excludes said manually adjustable impedance means and is energized by the voltage developed across the scanned condition-responsive impedance means and said fixed impedance means, said scanning switch means including means for sequentially connecting the other signal input terminal of said bridge unbalance responsive means to the juncture of the scanned variable responsive impedance means and said fixed impedance means, and variable value indicating means responsive to said bridge unbalance sensing means for indicating the value of the variable scanned.

4. Monitoring apparatus for monitoring the conditions of a number of variables comprising: individual detecting circuits for the variables each comprising: manually adjustable impedance means calibrated in units of high alarm limits of the associated variable, condition-responsive impedance means whose value varies in the same direction as the value of the variable and a fixed impedance means connected in series with said condition-responsive impedance means, a source of energizing potential connected to said impedance means, the voltage drop across said fixed and condition-responsive impedance means varying with the condition of the associated variable, control means responsive to current flow in the associated detecting circuit as determined by the impedance of said variable responsive impedance means and said manually adjustable impedance means; and a common circuit comprising a common variable impedance means and a common fixed impedance means connected in series circuit relation, bridge unbalance responsive means having a pair of signal input terminals, one of which is connected to the juncture of said common variable impedance means and said common fixed impedance means, said bridge unbalance sensing means varying said common variable impedance means until the signal voltage across said signal input terminals is substantially zero, scanning switch means for sequentially connecting said common variable impedance means and said common fixed impedance means to said variable-responsive impedance means and said fixed impedance means of each of said detecting circuits for forming therewith operative Wheatstone bridge circuit which excludes said manually adjustable impedance means and is energized by the voltage developed across the scanned condition-responsive impedance means and said fixed impedance means, the connection of said common impedances reducing the apparent value of said condition-responsive impedance means when connected thereto, said scanning switch means including means for sequentially connecting the other signal input terminal of said bridge unbalance responsive means to the juncture of the scanned variable responsive impedance means and said fixed impedance means, and variable value indicating means responsive to said bridge unbalance sensing means for indicating the value of the variable scanned.

5. In combination, a first circuit for detecting a given condition of a variable, said circuit including a variable-responsive impedance whose value is a function of the variable involved and a fixed impedance connected in series with said variable-responsive impedance, the voltage drop across said fixed and variable-responsive impedances varying with the condition of the variable, and control means responsive to the detection by said detecting circuit of said given variable condition; and a second circuit for measuring the value of the variable as determined from the impedance value of said variable-responsive impedance, said second circuit comprising a variable impedance in series with a fixed impedance, said latter variable and fixed impedances forming two arms of a Wheatstone bridge circuit, means connecting the outer ends of said variable-responsive impedance and said fixed impedance of said detecting circuit to said variable and fixed impedances of said second circuit for forming a Wheatstone bridge circuit energized by the voltage developed across said variable-responsive impedance and said fixed impedance of said detecting circuit, the arm of said bridge circuit including said variable impedance also including in series therewith a reference variable-responsive impedance whose value is a function of the value of a reference variable, bridge unbalance-responsive means connected between the juncture of said variable-responsive impedance and said fixed impedance of said detecting circuit and the juncture of said variable impedance and fixed impedance of said second circuit for automatically varying the variable impedance of said second circuit until balance of said Wheatstone bridge circuit is effected, and variable value indicating means responsive to said bridge unbalance-responsive means for indicating the value of the variable.

6. In combination, a first circuit for detecting a given condition of a variable, said circuit including a variable-responsive impedance whose value is a function of the variable involved, a fixed impedance connected in series with said variable-responsive impedance, the voltage drop across said fixed and variable-responsive impedances varying with the condition of the variable, and control means responsive to the detection by said detecting circuit of said given variable condition; and a second circuit for measuring the value of the variable as determined from the impedance value of said variable-responsive impedance, said second circuit comprising a variable impedance in series with a fixed impedance, said latter variable and fixed impedances forming two arms of a Wheatstone bridge circuit, means connecting the outer ends of said variable-responsive impedance and said fixed impedance on said detecting circuit to said variable and fixed impedances of said second circuit for forming a Wheatstone bridge circuit energized by the voltage developed across said variable-responsive impedance and said fixed impedance of said detecting circuit, bridge unbalance-responsive means connected between the juncture of said variable-responsive impedance and said fixed impedance of said detecting circuit and the juncture of said variable impedance and fixed impedance of said second circuit for automatically varying the variable impedance of said second circuit until balance of said Wheatstone bridge circuit is effected, and variable value indicating means responsive to said bridge unbalance-responsive means for indicating the value of the variable.

7. In combination, a first circuit for detecting a given condition of a variable, said circuit including a variable-responsive impedance whose value is a function of the variable involved and a fixed impedance connected in series with said variable responsive impedance, the voltage drop across said fixed and variable-responsive impedance varying with the condition of the variable, and control means responsive to the detection by said detecting circuit of said given variable condition; and a second circuit for measuring the value of the variable as determined from the impedance value of said variable responsive impedance, said second circuit comprising a variable impedance in series with a fixed impedance, said latter variable and fixed impedances forming two arms of a Wheatstone bridge circuit, means including high impedance isolation means connecting the outer ends of said variable-responsive impedance and said fixed impedance of said detecting circuit to said variable and fixed impedances of said second circuit for forming a Wheatstone bridge circuit energized by the voltage developed across said variable-responsive impedance and said fixed impedance of said detecting circuit, bridge unbalance-responsive means connected between the juncture of said variable-responsive impedance and said fixed impedance of said detecting circuit and the juncture of said variable impedance and fixed impedance of said second circuit for automatically varying the variable impedance of said second circuit until balance of said Wheatstone bridge circuit is effected, and variable value indicating means responsive to said bridge unbalance-responsive means for indicating the value of the variable.

8. Monitoring apparatus for monitoring the conditions of a number of variables comprising: individual detecting circuits for the variables each comprising: condition-responsive impedance means and a fixed impedance means connected in series with said condition-responsive impedance means, the voltage drop across said fixed and condition-responsive impedance means varying with the condition of the associated variable, a source of energizing potential connected to said impedance means, control means responsive to current flow in the associated detecting circuit as determined by the impedance of said variable responsive impedance means; and a common circuit for measuring the values of all of said variables, said common circuit comprising a common variable impedance means and a common fixed impedance means connected in series circuit relation, bridge unbalance sensing means having a pair of signal input terminals, one of which is connected to the juncture of said common variable impedance means and said common fixed impedance means, said bridge unbalance sensing means varying said common variable impedance means until the signal voltage across said signal input terminals is substantially zero, scanning switch means for sequentially connecting said common variable impedance means and said common fixed impedance means to said variable-responsive impedance means and said fixed impedance means of each of said detecting circuits for forming therewith an operative Wheatstone bridge circuit energized by the voltage developed across the scanned condition-responsive impedance means and said fixed impedance means, said scanning switch means including means for sequentially connecting the other signal input terminal of said bridge unbalance responsive means to the juncture of the scanned variable responsive impedance means and said fixed impedance means, isolation means in said common circuit for preventing loading of the scanned detecting circuit so that the scanning circuit involved is operative to monitor the high alarm limit of the variables involved, and variable value indicating means responsive to said bridge unbalance sensing means for indicating the value of the variable scanned.

9. Apparatus for monitoring the condition of a variable comprising: a source of energizing current, a number of independent parallel current paths operatively connected to said current source, a first one of said current paths comprising a condition-responsive impedance, a first control winding of a first and a second magnetic core unit, a second one of said current paths including a manually variable impedance and a second control winding of said first magnetic core unit connected in bucking relation to the associated first control winding, a third one of said current paths including a manually variable impedance and a second control winding of said second magnetic core unit connected in bucking relation to the associated first control winding, said manually variable impedance in said second current path including means for adjusting the current in the path to any one of a number of values which will provide a balance of the magnetomotive forces in said control windings of said first magnetic core unit for any one of a number of values of the associated variable, said manually variable impedance in said third current path being adapted to adjust the current in the path to any one of a number of values which will provide a balance of the magnetomotive forces in the control windings of said second magnetic core units for any one of a number of values of the associated variable, first control means responsive to the balance of the magnetomotive forces in said first magnetic core units, and second control means responsive to the balance of the magnetomotive forces in said second magnetic core unit.

10. Monitoring apparatus for monitoring the condition of a number of variables of the same type, said apparatus comprising individual detecting circuits for each variable comprising: a source of energizing current, a number of independent parallel current paths operatively connected to said current source, a first one of said current paths comprising a condition-responsive impedance, a first control winding of a first and a second magnetic core unit, a second one of said current paths including a manually variable impedance and a second control winding of said first magnetic core unit connected in bucking relation to the associated first control winding, a manually adjustable impedance in common with all of said detecting circuits, a third one of said current paths of each detecting circuit including said common manually adjustable impedance and a second control winding of said second magnetic core unit connected in bucking relation to the associated first control winding, said manually variable impedance in said second current path being calibrated in units of the associated variable and including means for adjusting the current in the path to any one of a number of values which will provide a balance of the magnetomotive forces in the control windings of said first magnetic core unit for any one of a number of high alarm limit values of the associated variable, said common manually variable impedance in said third current path being calibrated in units of the variables and including means for adjusting the current in the path to any one of a number of values which will provide a balance of the magnetomotive forces in the control windings of said second magnetic core unit for any one of a number of variable values below the high alarm limit of the associated variable, high alarm limit responsive means responsive to the balance of the magnetomotive forces in said first magnetic core unit, and indicating means responsive to the balance of the magnetomotive forces in said second magnetic core unit.

11. Apparatus for monitoring the condition of a variable comprising: a source of energizing current, a number of independent parallel current paths operatively connected to said current source, a first one of said current paths comprising a condition-responsive impedance, a first control winding of a first and a second magnetic core unit, a second one of said current paths including a manually variable impedance and a second control winding of said first magnetic core unit connected in bucking relation to the associated first control winding, a third one of said current paths including a manually variable impedance and a second control winding of said second magnetic core unit connected in bucking relation to the associated first control winding, said manually variable impedance in said second current path being calibrated in units of the associated variable values and including means for adjusting the current in the path to any one of a number of values which will provide a balance of the magnetic core unit for any one of a number of high alarm limit values of the associated variable, said manually variable impedance in said third current path being calibrated in units of the associated variable values and including means for adjusting the current in the path to any one of a number of values which will provide a balance of the magnetomotive forces in said control windings of said first magnetic core unit for any one of a number of low alarm limit values of the associated variable, high alarm limit responsive means responsive to the balance of the magnetomotive forces in said first magnetic core unit, and low alarm limit responsive means responsive to the balance of the magnetomotive forces in said second magnetic core unit.

12. Apparatus for monitoring the condition of a number of variables, said apparatus comprising a source of energizing current, a number of independent parallel current paths operatively connected to said current source, a first one of said current paths comprising a condition-responsive impedance, a first control winding of a first and a second magnetic core unit, a second one of said current paths including a manually variable impedance and a second control winding of said first magnetic core unit connected in bucking relation to the associated first control winding, a manually adjustable impedance in common with all of said detecting circuits, a third one of said current paths of each detecting circuit including said common manually adjustable impedance and a second control winding of said second magnetic core unit connected in bucking relation to the associated first control winding, said manually variable impedance in said second current path including means for adjusting the current in the path to any one of a number of values which will provide a balance of the magnetomotive forces in the control windings of said first magnetic core unit for any one of a number of values of the associated variable, said common manually variable impedance in said third current path including means for adjusting the current in the path to any one of a number of values which will provide a balance of the magnetomotive forces in the control windings of said second magnetic core unit for any one of a number of variable values of the associated variable, first control means responsive to the balance of the magnetomotive forces in said first magnetic core unit, and indicating means responsive to the balance of the magnetomotive forces in said second magnetic core unit.

13. In apparatus for monitoring the condition of a number of variables, individual detecting circuits for each variable comprising: a source of energizing current, a number of independent parallel current paths operatively connected to said current source, a first one of said current paths comprising a condition-responsive impedance, a first control winding of a first, a second and a third magnetic core unit, a second one of said current paths including a manually variable impedance and a second control winding of said first magnetic core unit connected in bucking relation to the assorted first control winding, a third one of said current paths including a manually variable impedance and a second control winding of said second magnetic core unit connected in bucking relation to the associated first control winding, a manually adjustable impedance in common with all of said detecting circuits, a fourth one of said current paths of each detecting circuit including said common manually adjustable impedance, and a second control winding of said third magnetic core control unit connected in bucking relation to the associated first control winding, said manually variable impedance in said second current path being calibrated in units of the associated variable values and including means for adjusting the current in the path to any one of a number of values which will provide a balance of the magnetomotive forces in said control windings of said first magnetic core unit for any one of a number of high alarm limit values of the associated variable, said manually variable impedance in said third current path being calibrated in units of the associated variable values and including means for adjusting the current in the path to any one of a number of values which will provide a balance of the magnetomotive forces in the control windings of said second magnetic core units for any one of a number of low alarm limit values of the associated variable, said common manually variable impedance in said fourth current path being calibrated in units of the variable and including means for adjusting the current in the path to any one of a number of variable values between said high and low alarm limits which will provide a balance of the magnetomotive forces in the control windings of said third magnetic core unit, high alarm limit responsive means responsive to the balance of the magnetomotive forces in said first magnetic core unit, low alarm limit responsive means responsive to the balance of the magnetomotive forces in said second magnetic core unit, and indicating means responsive to the balance of the magnetomotive forces in said third magnetic core unit.

14. Apparatus for monitoring the condition of a variable comprising a variable responsive resistance whose resistance value is a function of the value of the variable, and a control circuit responsive to said variable responsive resistance, said control circuit comprising: a first and a second magnetic core unit each having first and second control windings and an output winding wound about a saturable magnetic core, a source of direct current of fixed amplitude, a first branch circuit operatively connected to said source of direct current and comprising a series circuit of said variable responsive resistance and said first control windings of said first and second magnetic core unit wherein the magnitude of current flow through said first control winding follows the change in value of the resistance of said variable-responsive resistance, a second branch circuit independent of said first branch circuit operatively connected to said source of direct current and comprising a series circuit of a manually adjustable resistance for setting the monitoring apparatus to respond to a given condition of the variable and said second control winding connected to produce in said core a magnetomotive force in opposition to the magnetomotive force produced by the current flowing in said first control winding of said first magnetic core unit, the core of the latter core unit being saturated when said magnetomotive forces are substantially unequal and being relatively unsaturated when said magnetomotive forces are substantially equal, a first output circuit comprising a source of energizing current of periodically varying amplitude connected in series with said output winding of said first core unit, first control means for providing an indication of said condition of the variable, means responsive to the flow of a relatively low current in said first output circuit when the associated core is in its unsaturated state, where said output winding offers a relatively high impedance, for operating said first control means, a third branch circuit operatively connected to said source of direct current and independent of said first and second branch circuits, said third branch circuit comprising a series circuit of a manually adjustable resistance for setting the monitoring apparatus to respond to a second condition of the variable and said second control winding of said second magnetic core unit connected to produce in the associated core a magnetomotive force in opposition to the magnetomotive force produced by the current flowing in the associated first control winding, the associated core being saturated when said magnetomotive forces are substantially unequal and being relatively unsaturated when said magnetomotive forces are substantially equal, a second output circuit comprising a source of energizing current of periodically varying amplitude connected in series with the output winding of said magnetic core unit, second control means for providing an indication of said second condition of the variable, and means responsive to the flow of a relatively low current in said second output circuit when the associated core is in said relatively unsaturated state, where said output winding offers a relatively high impedance for operating said second control means.

References Cited in the file of this patent

UNITED STATES PATENTS

| | | |
|---|---|---|
| 2,219,939 | Rich | Oct. 29, 1940 |
| 2,465,191 | Borden | Mar. 22, 1949 |
| 2,706,799 | Howe | Apr. 19, 1955 |
| 2,730,697 | Wermelskirchen | Jan. 10, 1956 |
| 2,815,500 | Hance | Dec. 3, 1957 |
| 2,901,739 | Freitas | Aug. 25, 1959 |
| 2,946,989 | Loeber | July 26, 1960 |

FOREIGN PATENTS

| | | |
|---|---|---|
| 1,030,046 | Germany | May 14, 1958 |